Aug. 28, 1945.  T. W. MOORE  2,383,669
DYNAMO ELECTRIC MACHINE
Filed Nov. 28, 1942
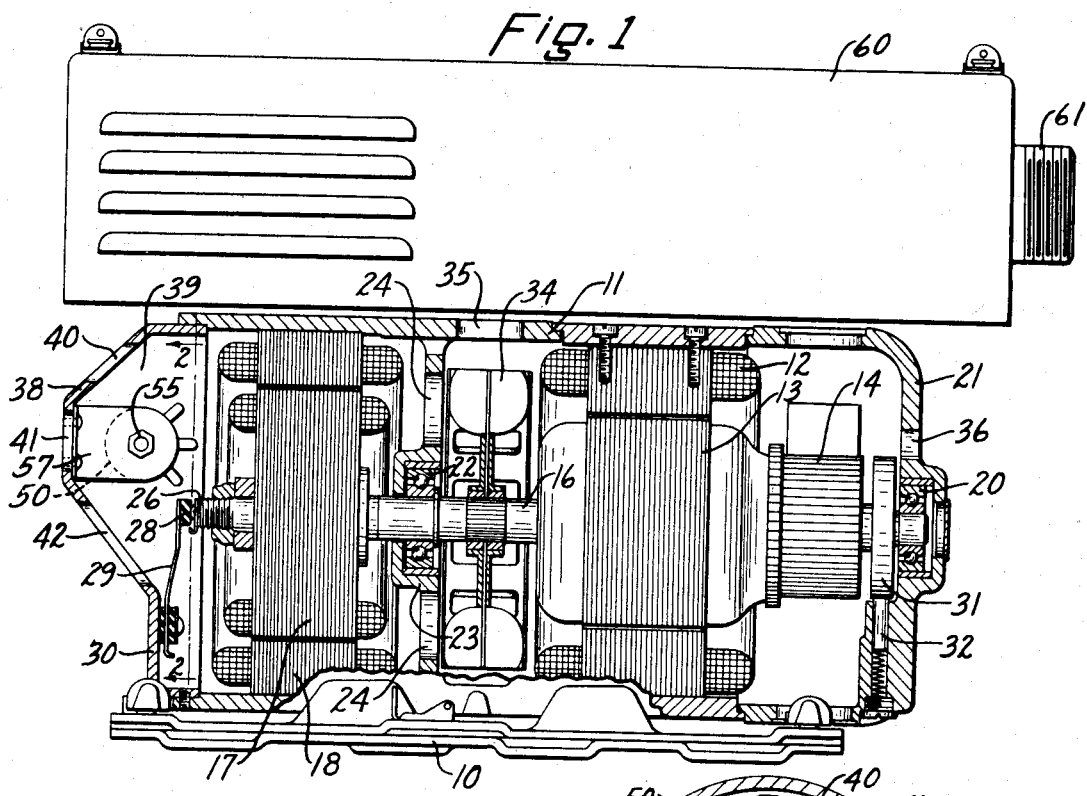
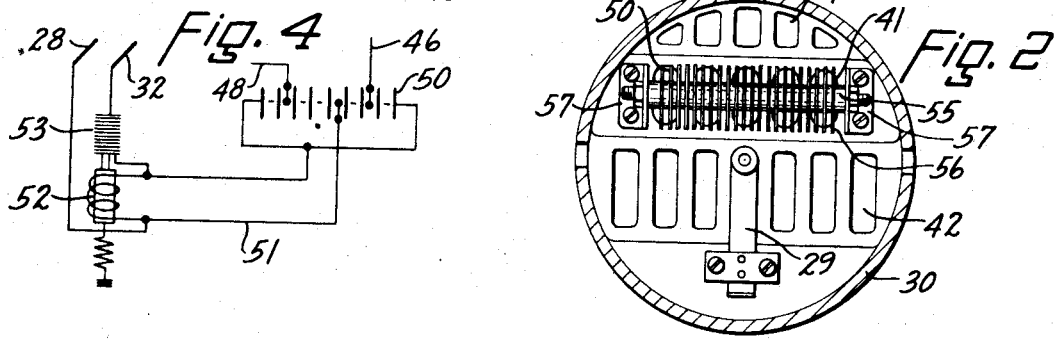
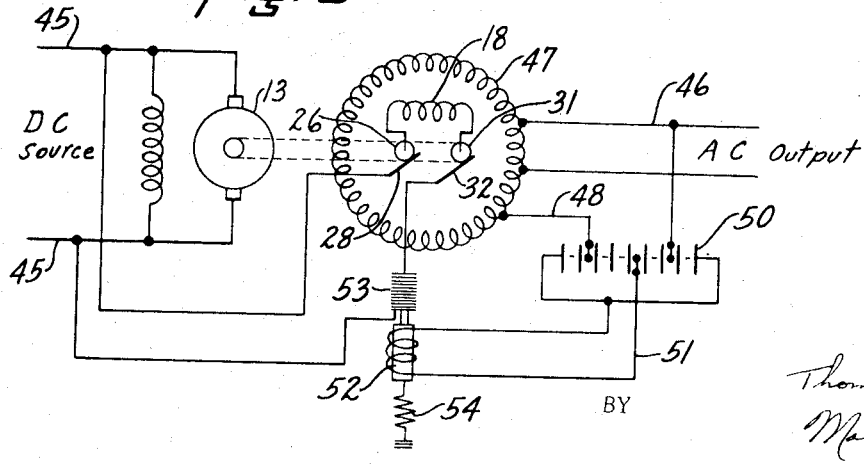
INVENTOR.
Thomas W. Moore
BY Marechal & Noe.

Patented Aug. 28, 1945

2,383,669

UNITED STATES PATENT OFFICE 2,383,669

DYNAMOELECTRIC MACHINE

Thomas W. Moore, Dayton, Ohio, assignor to The Leland Electric Company, Dayton, Ohio, a corporation of Ohio Application November 28, 1942, Serial No. 467,195

10 Claims. (Cl. 171—252)

This invention relates to dynamo electric machines.

It is the principal object of the invention to provide a construction of dynamo electric machine which is simple, compact and light in weight and which provides reliable operation with minimum wear, vibration and radio noise.

It is also an object to provide a dual unit dynamo electric machine with one of the units being mounted on an overhanging shaft leaving an open space at the end of the unit for receiving control devices and with a cooling fan provided for causing a flow of air through the units and over such control devices.

It is also an object of the invention to provide such a dynamo electric machine with a rectifier unit to which generated current is supplied for the purpose of obtaining a source of direct current and in which machine the temperatures are controlled, particularly with respect to the rectifier, making the machine capable of being operated satisfactorily over a wide temperature range without injury or damage to the operating characteristics of the rectifier.

It is a still further object to provide a motor driven alternator with which there is associated a control device incorporating a rectifier unit, a cooling fan being arranged to discharge cooling air from an intermediate point in the common housing enclosing the rotating machine elements and the rectifier, the air being drawn inwardly from the ends of the machine and the rectifier being located in the path of the cooling air initially entering the housing so that it is subjected to the flow of cooling air before the temperature of the air has increased by the heating of the rotating machine.

Other objects and advantages will be apparent from the following description, the accompanying drawing, and the appended claims.

In the drawing,

Fig. 1 is a vertical axial section of a machine constructed in accordance with the present invention below an upper casing for housing control devices and the like;

Fig. 2 is a sectional view on the line 2—2 of Fig. 1 from the inner side of the machine looking outwardly toward the end cap and rectifier assembly;

Fig. 3 is a schematic diagram of the circuit connections; and

Fig. 4 is a partial diagram showing a modified arrangement.

Referring to the drawing which shows a preferred embodiment of the invention, a base structure is indicated at 10 on which a common housing 11 is mounted. Within the housing is a rotary driving motor 12 the rotating part or armature 13 of which is shown as provided with a commutator 14. The motor is shown as a direct current machine preferably having essentially the operating characteristics of a shunt machine. It is directly mounted on the same shaft 16 with the exciter winding 17 of alternator 18.

The shaft 16 is carried in anti-friction bearings one of which 20 is positioned in the motor end cap 21. The other is located between the motor and alternator as shown at 22, being positioned in a web 23 projecting inwardly from the outer housing 11, the web having apertures therein as indicated at 24 to facilitate free flow of cooling air therethrough. The drive shaft 16 is extended to support the exciter winding 17 in overhanging relation thereon leaving the end space outwardly of the alternator relatively free and clear. One side of the exciter winding is grounded to shaft 16 and connection from the other side is made to button 26 carried on but electrically insulated from the end of shaft 16 so that contact may be made with a stationary contact member 28 carried by spring arm 29 fastened to end cap 30 of the alternator for supplying the exciter current. A single slip ring 31 is carried by the shaft 16 at the opposite end immediately adjacent bearing 20, brush 32 providing connection for the opposite pole and giving good operating characteristics because of the freedom from vibration of the slip ring 31 by reason of its proximity to bearing 20. Further, the stationary contact 28 operates very satisfactorily by reason of the yieldable pressure applied thereto axially of the shaft and the limited friction which occurs with button 26.

In the space between the motor 12 and the alternator 18, and closely adjacent web 23, there is located a fan means 34, which is fixed to the shaft 16 and provided with suitable fan blades so that upon rotation it will create a flow of cooling air. A series of apertures 35 are located circumferentially around housing 11 radially opposite the fan means, and the fan blades are so arranged as to provide for expelling the air through the various openings thereof.

Motor end cap 21 is provided with air inlet apertures 36 through which air is drawn by the fan to flow across the motor windings for cooling the same. Alternator end cap 30 is of special construction, being formed with an enlarged section 38 providing a space 39 inwardly thereof between the end cap and the alternator itself and primarily to one side of the axis of the shaft. This enlarged portion 38 of the end cap is formed with a series of air inlet openings 40 in its upwardly inclined face, with a second series of air inlet openings 41 in its vertical face, and with a third series of air inlet openings 42 in its downwardly inclined face. It will be clear from this description that a substantial inlet area is provided in the end cap construction to assure an adequate flow of cooling air inwardly to the alternator, under the action of the fan element 34. Likewise there is substantial open area through which heat from inside the end cap can be dissipated by radiation.

Referring to the circuit diagram a power source is shown at 45 which may be the low voltage direct current source such as usually provided on aircraft and the like. Connection is made from this source to the drive motor and likewise to the exciter winding of the alternator. The alternator is provided with an output circuit 46 which is connected to the stationary winding 47 located within the housing 11. This forms the main output circuit which is used for the supply of relatively high frequency current such for example as 400 cycles at 120 volts for use as desired. A tap 48 in the winding 47 at the two thirds point is also brought out and connection is made from this tapped winding and one side of the main winding to a rectifier which is shown at 50 so that it is supplied at about 80 volts. Preferably such rectifier is of the dry contact type, comprising a group of selenium oxide treated plates arranged in face to face contact with each other. There is thus provided a lower voltage connection for the rectifier, and the rectified current is supplied through circuit 51 to a solenoid 52 which is mechanically connected to the regulator element 53 in the circuit of the exciter, indicated as a carbon pile regulator, the rectified supply of generated alternating current being thus utilized to control the excitation and hence the output of the generator. For example, upon a drop in generated voltage, the rectified voltage across circuit 51 will be correspondingly reduced and this will result in opposing the action of spring 54 with less force so that more pressure is applied to the pile, its resistance is reduced, and a greater exciting current flows which tends to increase the generated voltage of the alternator until a condition of equilibrium is reestablished.

Fig. 4 shows schematically an alternative circuit in which the rectifier supplies control potential to actuate the regulator in the exciter circuit and in addition supplies the exciter current itself, such circuit being useful where a higher voltage source of direct current is desired than is available through the direct current power source. In both cases the rectifier is supplied with generated alternating current and in turn is arranged to control the operation of the generator through the regulating action of solenoid 52 and resistor 53.

In order that the rectifier may continue to operate properly and efficiently, it is necessary to prevent its temperature from reaching such a point that the rectifying characteristics of the coatings on the rectifier plates would be adversely affected. And in order to make it possible to operate the machine under temperature conditions which are relatively high and which approach the limiting temperature characteristics at which the rectifier can be operated, it is important to provide for so effectively cooling the rectifier that its temperature is maintained as closely as possible to ambient temperature, or with only a very limited temperature rise under load.

The rectifier 50 is therefore assembled on a central supporting shaft 55, a plurality of heat radiating fins 56 being assembled on the shaft between adjacent rectifier discs. The shaft is mounted at either end on brackets 57 which are bolted to the vertical face of the end cap, supporting the rectifier in space 39 and directly opposite the vertically extending apertures 41. In this position the rectifier extends transversely of the motor shaft, being positioned at one side of the axis of the shaft, and in the direct path of flow of the cooling air streams entering through all the apertures 40, 41 and 42. It will be clear that in such position a highly effective flow of cooling air across the face of and substantially parallel with the cooling fins is provided for, and that such cooling air is not preheated by having absorbed heat from passage through the windings of the machine. It is also clear that the substantial extent of the openings provided in all directions with respect to the rectifier unit makes possible the free dissipation of heat by radiation from such unit, as well as the dissipation into the air streams as described above. The absence of a bearing for the shaft at this end of the machine also facilitates free flow of air and the desired heat transfer and affords a construction which is easily constructed and which has desirable characteristics of freedom from vibration and substantial absence of arcing or commutating difficulties resulting therefrom. Also the interposition of the metallic structure of web 23 and the fan blades between the two units of the dynamo electric machine acts as a shield for high frequency waves and thus avoids creating objectionable radio interference while the machine is in operation.

Above the housing 11 there is positioned a casing 60 which has an outlet connection 61, this casing providing for receiving the remaining control mechanism which is utilized in conjunction with the power unit. The control mechanism in such casing is not within the path of flow of the air streams, but the positioning of the rectifier in the position described here serves to afford the advantages which have been described above.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. A dual unit dynamo electric machine comprising a motor, a generator driven thereby, a common drive shaft for said motor and generator, a common housing for said motor and generator, end caps at the ends of said housing, a bearing for said drive shaft positioned in one end cap, a second bearing for said shaft positioned intermediate said motor and generator and supported from said housing, said drive shaft having an overhanging part carrying the rotating element of one of said units, a rotatable contact in the circuit of said rotating element and carried on the end of said shaft, and a stationary contact member extending across the end of said shaft and yieldably engaging said rotatable contact.

2. A dual unit dynamo electric machine comprising a motor, a generator driven thereby, a common drive shaft for said motor and generator, a common housing for said units, end caps at the ends of said housing, a bearing for said drive shaft positioned in one of said end caps, a web supported intermediate said units from said housing, a second bearing for said shaft positioned in said web, said shaft having an overhanging part carrying the rotating element of said generator, a rotatable contact in the circuit of said rotating element carried on the end of said shaft, a stationary contact member extending across the end of said shaft and yieldably engaging said rotatable contact, and a slip ring also in the circuit of said rotating element located adjacent said first mentioned bearing.

3. A dual unit dynamo electric machine comprising a drive motor having a drive shaft, an alternator on said drive shaft, a common housing for enclosing said machines, end caps at the ends of said housing, a bearing for journaling said drive shaft positioned in one of said end caps, a second bearing for said shaft positioned intermediate said motor and said alternator, the end of said shaft within the other of said end caps being unsupported, fan means on said shaft intermediate said motor and said alternator for creating a flow of cooling air in opposite directions through said machines and said end caps, and a rectifier of the dry contact type in circuit with one of said units and located inwardly of said housing at the unsupported end of said shaft.

4. A dual unit dynamo electric machine comprising a drive motor having a drive shaft, an alternator on said drive shaft, a common housing for enclosing said machines, end caps at the ends of said housing, a bearing for journaling said drive shaft positioned in one of said end caps, a second bearing for said shaft positioned intermediate said motor and said alternator, means including a rectifier located within said other end cap and closely adjacent the end of one of said units for controlling the operation of said alternator, and fan means on said shaft intermediate said motor and said alternator for creating a flow of cooling air in opposite directions through said units, said end caps, and said controlling means.

5. A dynamo electric machine comprising a drive motor, a direct-connected alternator driven by said motor, a common housing for enclosing said machines, fan means located between said motor and said alternator for creating a flow of cooling air in opposite directions through said motor and said alternator, a dry contact type rectifier in the circuit of said alternator for controlling the exciter winding thereof, and means for positioning the rectifier within said common housing and outwardly of one of said machines to be located in the path of the flow of cooling air before said air traverses said one of said machines.

6. A dual unit dynamo electric machine comprising a drive motor, an alternator driven by said motor, a common housing for said drive motor and said alternator, fan means at one end of said alternator within said housing for creating a flow of cooling air therethrough from one end thereof to the other, a dry contact type rectifier in the circuit of said alternator for controlling the exciter winding thereof, means for positioning the rectifier within said common housing at the end of said alternator opposite that at which said fan means is located to provide for subjecting said rectifier to the inwardly flowing cooling air before it has been heated by passage through said housing and over said alternator.

7. A dynamo electric machine comprising a drive motor, an alternator directly connected with said motor, a common housing for enclosing said motor and alternator, fan means located between said alternator and motor for causing a flow of cooling air through both said motor and alternator, a dry contact type rectifier in the circuit of said alternator for controlling the exciter winding thereof, and means for positioning said rectifier within said housing extending transversely of the axis of said alternator at the outer end thereof and in the direct path of inwardly flowing cooling air to provide for effective cooling of said rectifier before passage of the air over said alternator.

8. A dynamo electric machine comprising a drive motor, an alternator directly connected with said motor, a common housing for enclosing said motor and alternator, a bearing for the drive shaft of said motor at one end thereof, a second bearing for said shaft intermediate said motor and alternator, said alternator being carried on the overhanging end of said shaft, fan means located between said alternator and motor for causing a flow of cooling air through both said motor and alternator in opposite direction, a dry contact type rectifier in the circuit of said alternator for controlling the exciter winding thereof, and means for positioning said rectifier across one end of said housing at the overhanging end of said alternator in the direct path of inwardly flowing cooling air to provide for effective cooling thereof.

9. A dual unit dynamo electric machine comprising a drive motor, an alternator driven by said motor, means rotatably mounting said motor and said alternator with the latter extending in overhanging relation with respect to said mounting means, fan means at one end of said alternator for creating a flow of cooling air therethrough, a housing for said alternator enclosing said fan means, an end cap for said alternator at said overhanging end and opposite that at which said fan means is located, said end cap having an enlargement formed to provide a space inwardly thereof, a dry contact type rectifier in the circuit of said alternator for controlling the exciter winding thereof, and means for positioning said rectifier within said enlarged space inwardly of said end cap and in the inwardly flowing path of the cooling air stream entering said alternator.

10. A dual unit dynamo electric machine comprising a drive motor, an alternator directly mounted on the drive shaft of said motor, a common housing means enclosing said motor and alternator, fan means located intermediate said motor and alternator within said housing providing for creating an inward flow of cooling air in opposite directions through both said motor and alternator and discharging the same outwardly through said housing, end caps at the respective ends of said motor and alternator having apertures therein providing for entry of the flow of cooling air, a bearing for journaling the drive shaft in the end cap of the motor, another bearing for journaling the drive shaft located between the motor and the alternator with the alternator supported on the overhanging end of said drive shaft leaving the space within the alternator end cap relatively free and open, said alternator end cap having an enlarged portion forming a space inwardly thereof, a dry contact type rectifier in the circuit of said alternator for controlling the exciter winding thereof, and means positioning said rectifier transversely of the motor shaft within said space and in the direct path of flow of said inwardly moving streams of cooling air on the entering side thereof.

THOMAS W. MOORE.